Aug. 21, 1928.
W. S. MAPLE
RADIO GROUND ANTENNA
Filed April 20, 1927
1,681,644
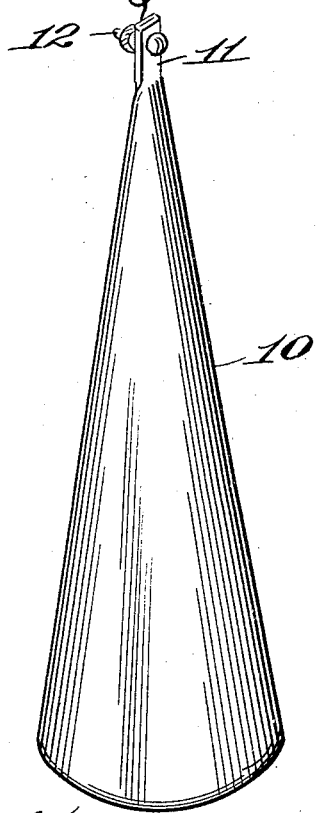
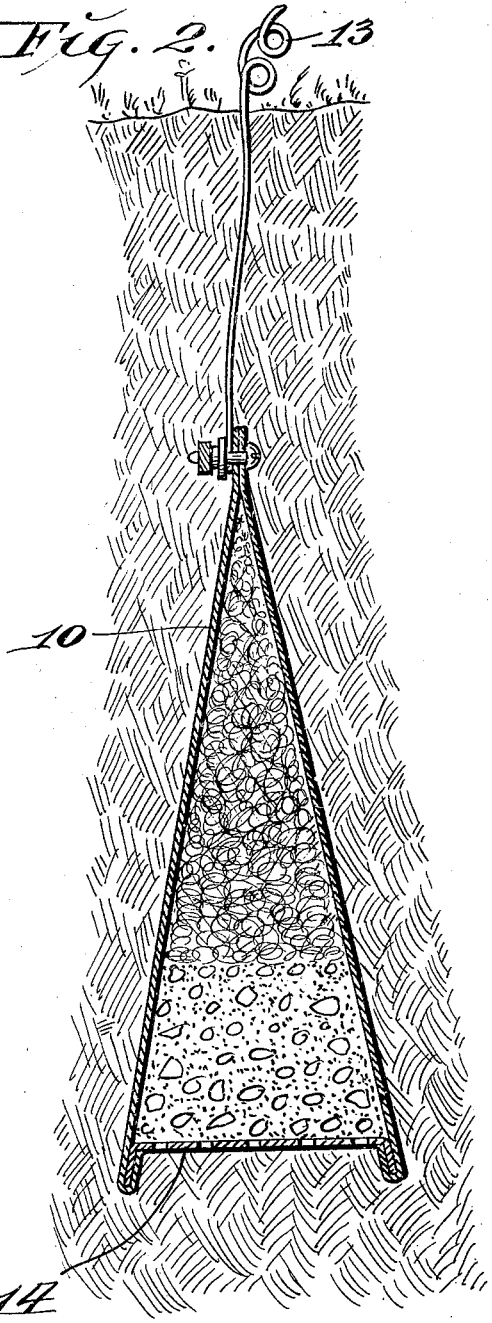
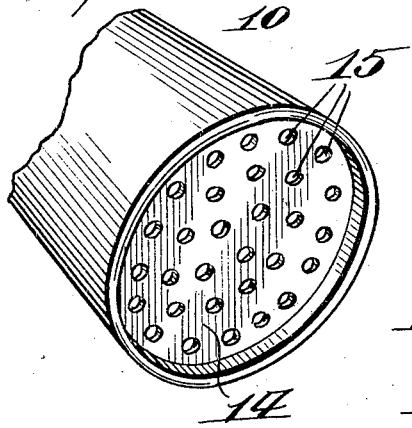
INVENTOR:—
William S. Maple.
By Martin P. Smith Atty.

Patented Aug. 21, 1928.

1,681,644

UNITED STATES PATENT OFFICE.

WILLIAM S. MAPLE, OF LOS ANGELES, CALIFORNIA.

RADIO GROUND ANTENNA.

Application filed April 20, 1927. Serial No. 185,168.

My invention relates generally to radio apparatus, and more particularly to a combined ground and antenna, the principal object of my invention being to provide a relatively simple, practical and inexpensive device comprising a container that is filled or partially filled with a combination of chemicals and which device, when buried in the ground, functions as a ground for the radio receiving set and also as an antenna, in that said device is highly effective in collecting the vibrations of luminiferous ether or radio magnetic waves.

With the foregoing and other objects in view, my invention consists in certain novel features of construction and arrangement of parts that will hereinafter be more fully described and claimed and illustrated in the accompanying drawing, in which—

Fig. 1 is a perspective view of a ground antenna constructed in accordance with my invention.

Fig. 2 is a section taken lengthwise through the center of the ground antenna and showing the same buried in the ground and connected to the ground wire or conductor that leads to the receiving set.

Fig. 3 is a perspective view looking against the underside of my improved ground antenna.

Referring by numerals to the accompanying drawing, which illustrates a practical embodiment of my invention, 10 designates an elongated hollow conical container that is preferably formed of metal such as copper, the apex of said conical container being flattened to produce an ear 11, in which is seated a binding post 12 and to which latter is connected the ground conductor 13 that leads to the radio apparatus.

The lower end of the conical container 10 is closed by a metal plate 14, preferably copper, and said plate is provided with a series of perforations 15.

When the ground antenna is made ready for use and before the perforated bottom 14 is secured to the conical body 10, the latter is filled or partially filled with a mixture of blue vitriol (copper sulfate), salt (sodium chloride) and carbonate of soda, the approximate proportions of these ingredients being as follows: blue vitriol 43%, salt 33%, and carbonate of soda 24%.

When the filled or partially filled conical member is ready to be inserted in the ground, it is turned up-side-down and a quantity of water poured into the container through the perforations 15. The device is now immediately turned right-side-up and embedded in the ground so that its upper end occupies a position about ten or twelve inches below the surface of the ground. Before the device is thus buried in the ground, the ground conductor 13 from the radio apparatus is connected to binding post 12.

When the container is turned right-side-up and embedded in the ground, the combination of chemicals within the container, and which have been moistened by the water, will settle into a practically solid mass in the lower portion of the chamber within the container and the chemicals, reacting on each other, will in a short time produce a spongy mass that will fill the upper portion of the chamber within the container. Obviously a certain amount of the moist chemicals will discharge from the perforations 15 in the bottom plate 14, and such chemicals will percolate downward through the earth beneath the container and this mass of earth impregnated with the chemicals will serve to attract and concentrate luminiferous ether or radio magnetic waves that pass through the earth. The salt and carbonate of soda form a chemical combination that tends to neutralize the acid content of the copper sulfate and thereby counteracts the otherwise destructive effect of said copper sulfate on the copper wall of the container.

The body of chemicals within the lower portion of the container and the spongy mass in the upper portion thereof, together with the metal of which the container is formed, combine to produce an especially effective electric conductor which has the desirable faculty of gathering luminiferous ether or radio magnetic waves and, due to the particular shape of the container and the conical mass contained therein, these waves are concentrated as they pass upward and are delivered to the conductor that leads to the radio apparatus.

In tests and experiments, I have demonstrated that the best results in radio reception with devices of the character to which my invention relates are obtained by collecting and drawing the radio magnetic waves at a point in line with the ground wire that leads to the radio set and for this reason I prefer to make the container 10 in the form of an elongated cone.

Further, by the use of a conical shaped container, a certain amount of gas that is liberated from the chemicals is trapped in the upper portion of the container, thereby causing sufficient pressure to insure the discharge of a certain portion of the moist chemicals from the apertures 15 in the bottom 14 and these chemicals that percolate the earth immediately beneath the container provide a field or zone that is of material assistance in the attraction, collection and concentration of radio magnetic waves.

The combination of chemicals, and particularly the salt content, has the faculty of attracting moisture even in apparently dry earth, and this condition is very helpful in the operation of the device while the same is performing the functions of an antenna, or an electric ground.

I have also demonstrated in practice that the combination of chemicals used in my improved ground antenna will collect and conduct ether waves.

The metal container of the device provides a perfect ground contact and dispenses with the use of any other ground wires or connections. When used as an antenna, no aerial is necessary and the radio set with which the device is associated has very clear reception, a relatively fine degree of selectivity and receives practically no static or local disturbances.

Further, a set equipped with my improved ground antenna may be operated with comparatively little power and said ground antenna is capable of picking up relatively weak radio magnetic waves, thereby insuring greater distance capacity than is possible with radio sets equipped with standard forms of antenna and ground connections.

It will be understood that minor changes in the size, form and construction of the various parts of my improved radio ground antenna may be made and substituted for those herein shown and described without departing from the spirit of my invention, the scope of which is set forth in the appended claims.

I claim as my invention:

1. In a radio ground antenna, a metal container and a mixture of copper sulfate, sodium chloride and carbonate of soda within said container.

2. In a radio ground antenna, a conical metal container and a mixture of copper sulfate, sodium chloride and carbonate of soda within said container.

3. In a radio ground antenna, a conical metal container, a mixture of copper sulfate, sodium chloride and carbonate of soda within said container and the lower portion of which container is perforated.

4. In a radio ground antenna, a mixture of copper sulfate, sodium chloride and carbonate of soda and means for confining and holding said mixture so as to render it accessible for electrical connection.

5. In a radio ground antenna, a mixture of copper sulfate, sodium chloride and carbonate of soda and means for confining and holding said mixture in conical form.

6. In a radio ground antenna, a conical metal container, a conductor connected to the upper portion of said conical container and a mixture of copper sulfate, sodium chloride and carbonate of soda within said container.

7. In a radio ground antenna, a conical metal container, a conductor connected to the upper portion of said conical container, a mixture of copper sulfate, sodium chloride and carbonate of soda within said container and the lower portion of which container is perforated.

In testimony whereof I affix my signature.

WILLIAM S. MAPLE.